United States Patent
Sibbach et al.

(10) Patent No.: US 12,358,637 B1
(45) Date of Patent: Jul. 15, 2025

(54) AIR INLET CONFIGURATIONS FOR HYBRID AIRCRAFT

(71) Applicants: General Electric Company, Evendale, OH (US); GE Avio S.r.l., Rivalta di Torino (IT)

(72) Inventors: Arthur W. Sibbach, Boxford, MA (US); Vincenzo Martina, Rivalta di Torino (IT); Tomasz Iglewski, Warsaw (PL)

(73) Assignees: General Electric Company, Evendale, OH (US); GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 18/936,310

(22) Filed: Nov. 4, 2024

(51) Int. Cl.
*B64D 33/02* (2006.01)
*B64D 27/33* (2024.01)

(52) U.S. Cl.
CPC ............. *B64D 33/02* (2013.01); *B64D 27/33* (2024.01); *B64D 2033/0293* (2013.01)

(58) Field of Classification Search
CPC  B64D 27/33; B64D 33/02; B64D 2033/0293; B64D 33/08
USPC ...................................................... 244/53 B
See application file for complete search history.

(56) References Cited

U.S. PATENT DOCUMENTS

| | | | |
|---|---|---|---|
| 1,962,685 A | 6/1934 | Green | |
| 5,725,180 A * | 3/1998 | Chamay | F02C 7/04 244/53 B |
| 9,057,329 B2 | 6/2015 | Weir et al. | |
| 10,260,417 B2 * | 4/2019 | Wood | B64C 7/02 |
| 10,364,745 B2 | 7/2019 | Todorovic | |
| 10,518,869 B2 | 12/2019 | Foresto et al. | |
| 10,794,280 B2 * | 10/2020 | Yan | B64D 27/10 |
| 11,072,435 B2 * | 7/2021 | Mccage | F02C 7/20 |
| 11,572,191 B1 | 2/2023 | Allias et al. | |
| 12,025,055 B1 * | 7/2024 | Wood | F02C 6/206 |
| 2019/0161167 A1 * | 5/2019 | Wood | B64D 33/02 |
| 2020/0232392 A1 | 7/2020 | Bousfield | |
| 2022/0154651 A1 * | 5/2022 | Bowden | B64D 27/33 |
| 2023/0021085 A1 | 1/2023 | Allias et al. | |
| 2023/0085244 A1 * | 3/2023 | Miller | B64D 33/02 415/68 |
| 2024/0190566 A1 * | 6/2024 | Tulsyan | B64D 33/08 |

FOREIGN PATENT DOCUMENTS

EP            4365072 A1      5/2024

* cited by examiner

*Primary Examiner* — Brady W Frazier
(74) *Attorney, Agent, or Firm* — Carter, DeLuca & Farrell LLP (57) ABSTRACT

A hybrid electric turboprop includes a propeller, a thermal engine, an electric motor, a gearbox, and an air inlet. The propeller is configured to rotate about a propeller axis and includes a plurality of blades extending radially outwardly from the propeller axis such that, as the propeller is rotated about the propeller axis, the plurality of blades define a substantially circular blade path area centered about the propeller axis and having a radius. The gearbox couples both the thermal engine and the electric motor to the propeller to enable each of the thermal engine and the electric motor to drive rotation of the propeller about the propeller axis. The air inlet defines an opening. A radial distance is defined from the propeller axis to a location within the opening. The radial distance is equal to or less than 60% of the radius.

20 Claims, 8 Drawing Sheets

FIG. 14

AIR INLET CONFIGURATIONS FOR HYBRID AIRCRAFT

FIELD

This disclosure relates to hybrid aircraft and, more particularly, to air inlet configurations for hybrid aircraft such as, for example, hybrid electric turboprop aircraft.

BACKGROUND

A conventional propeller-based aircraft generally includes a fuselage, a pair of wings, and a propulsion system including one or more thermal engines configured to drive one or more propellers. Turboprop aircraft, for example, typically utilize one or more gas turbine engines to drive one or more propellers. Turboprop aircraft include single turboprop aircraft, which may include a single turboprop at the nose of the aircraft, as well as double turboprop aircraft, which may include a turboprop mounted on each wing. Still other multi-turboprop aircraft may include, for example, two or more turboprops mounted on each wing.

More recently, hybrid aircraft have begun to be developed, including hybrid electric turboprop aircraft that employ both a thermal, e.g., gas turbine, engine and an electric motor to drive each propeller. In such hybrid electric turboprop aircraft, the presence of both the thermal engine and the electric motor introduces spatial constraints that create challenges with respect to arranging the various system components in an effective and efficient manner.

BRIEF DESCRIPTION OF THE DRAWINGS

Features of this disclosure will become more apparent in view of the following detailed description when taken in conjunction with the accompanying drawings, wherein.

DETAILED DESCRIPTION

Approximating language, as used herein, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

Figure 1:
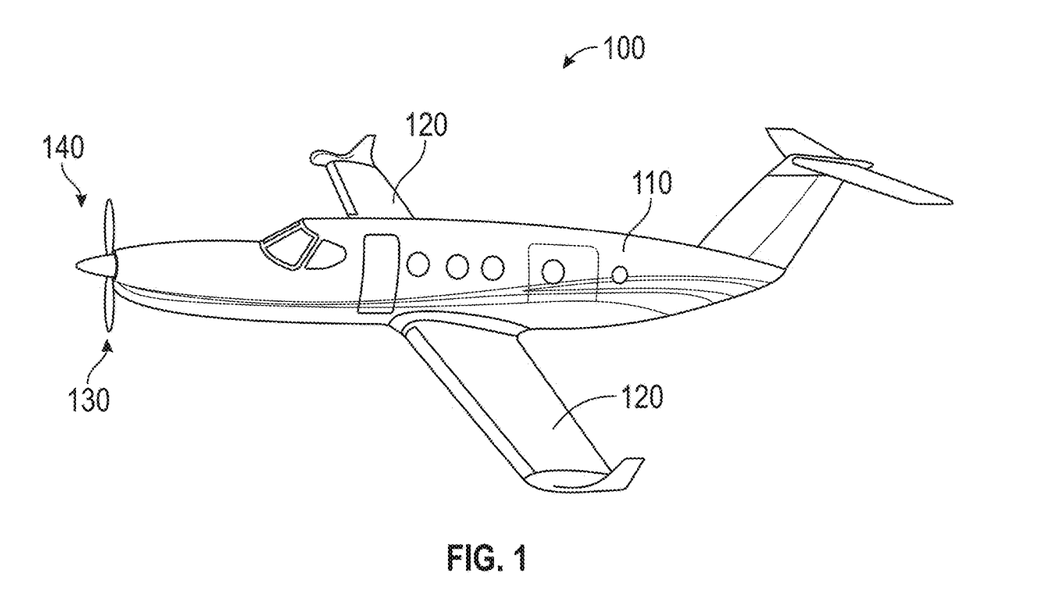
FIG. 1 is a side, perspective view of an aircraft in accordance with this disclosure including a hybrid electric turboprop disposed at the nose of the aircraft.
Figure 2:
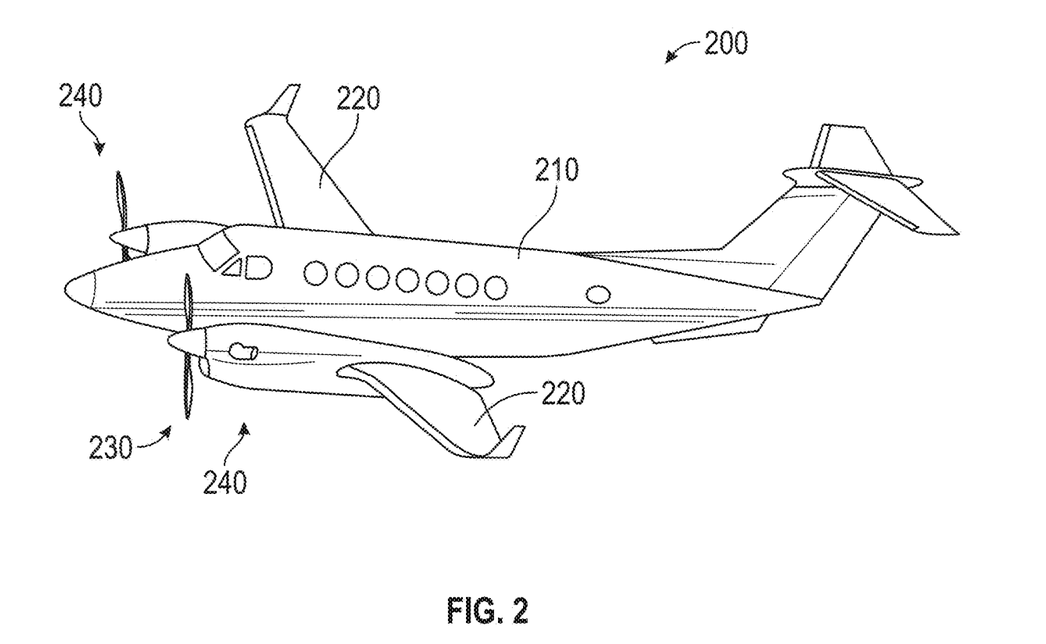
FIG. 2 is a side, perspective view of another aircraft in accordance with this disclosure including a pair of wing-mounted hybrid electric turboprops.

Referring generally to FIGS. 1 and 2, aircraft 100, 200 in accordance with this disclosure are shown each including a fuselage 110, 210, a pair of wings 120, 220, and a propulsion system 130, 230, respectively. Propulsion system 130 of aircraft 100 includes a hybrid electric turboprop 140 disposed at the nose of aircraft 100, while propulsion system 230 of aircraft 200 includes a hybrid electric turboprop 240 mounted on each wing 220 of aircraft 200. The hybrid electric turboprops provided in accordance with this disclosure and detailed below may be implemented as hybrid electric turboprop 140 of aircraft 100, one or both of the hybrid electric turboprops 240 of aircraft 200, and/or may be implemented as the hybrid electric turboprop(s) of any other suitable aircraft.

Figure 3A:
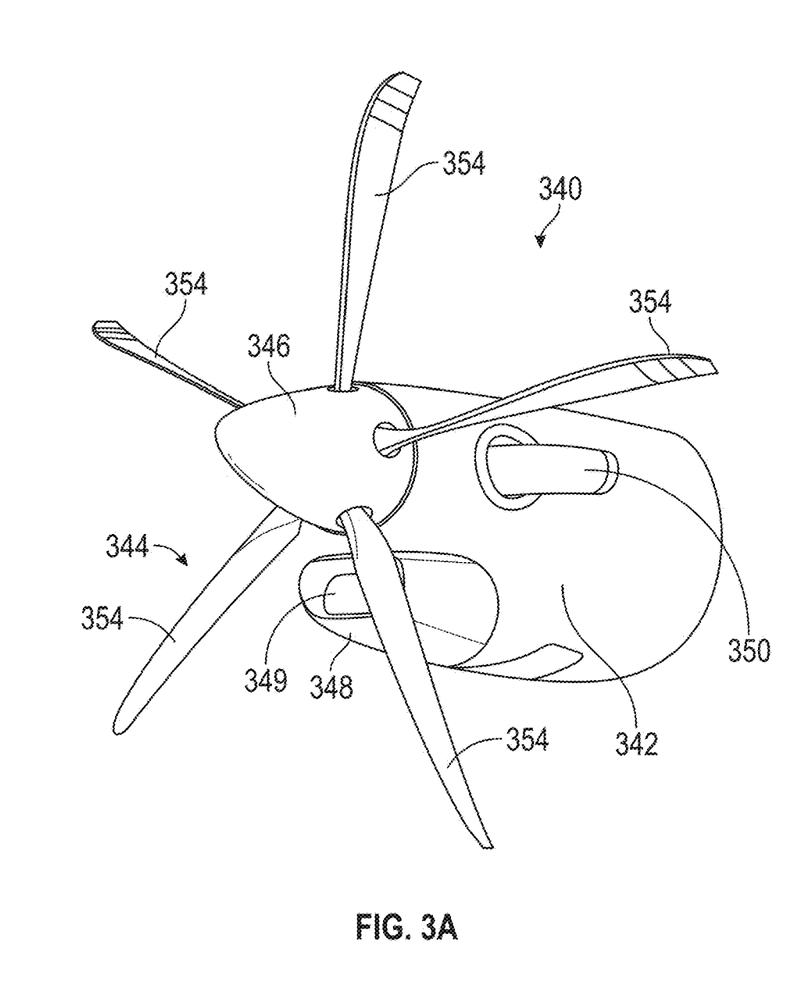
FIG. 3A is a front, perspective view of a portion of a hybrid electric turboprop in accordance with this disclosure and configured for use with the aircraft of FIG. 1, the aircraft of FIG. 2, and/or any other suitable aircraft.
Figure 3B:
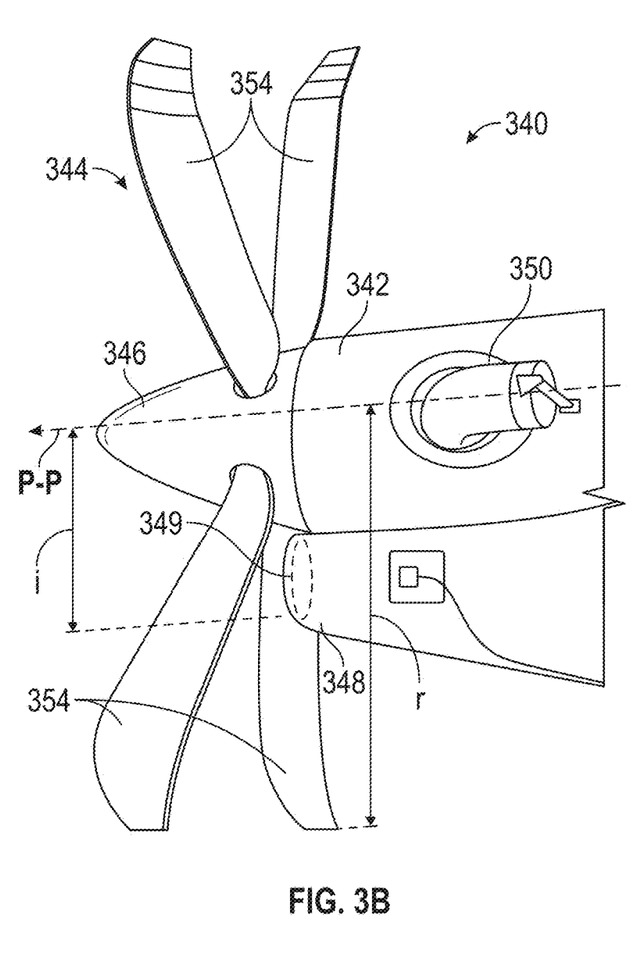
FIG. 3B is a side, perspective view of a portion of the hybrid electric turboprop of FIG. 3A, illustrating the position of the air inlet relative to the propeller diameter in accordance with this disclosure.
Figure 4:
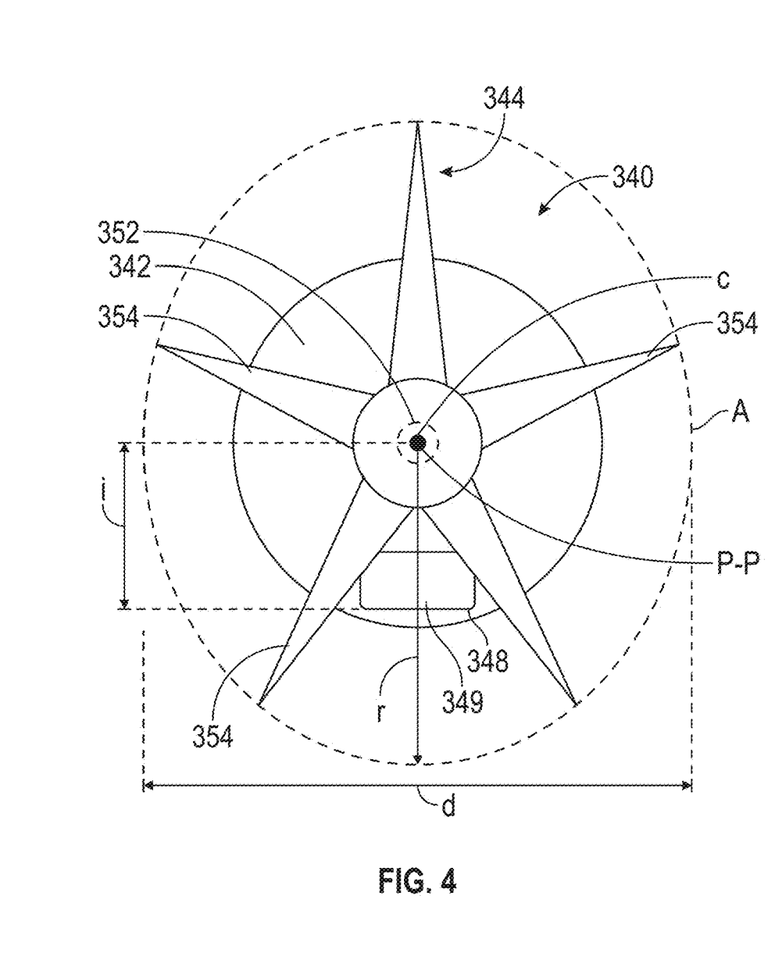
FIG. 4 is a front view of the hybrid electric turboprop of FIG. 3A.

Turning to FIGS. 3A, 3B, and 4, a hybrid electric turboprop 340 in accordance with this disclosure is shown generally including a housing 342 (separate from or a portion of the aircraft fuselage), a propeller 344, a nose cone 346, an air inlet 348, and one or more exhausts 350. With momentary additional reference to FIGS. 6 and 7, hybrid electric turboprop 340 further includes an internal drive system 360 including, among other components (in aspects), a thermal (e.g., gas turbine) engine 362, an electric motor 370, and a gearbox 380. Internal drive system 360 is configured to rotationally drive propeller 344. More specifically, gearbox 380 is coupled to thermal engine 362 and electric motor 370 on an input side of gearbox 380, and to a propeller base 352, e.g., a propeller shaft, propeller hub, or other suitable propeller base configured to drive rotation of propeller 344, on an output side of gearbox 380 to enable rotational driving of propeller base 352 and, thus, propeller 344 from either or both of thermal engine 362 and/or electric motor 370, thus providing hybrid functionality. Propeller 344 is mounted on propeller base 352 substantially coaxially about a propeller axis "P-P" defined by propeller base 352 and is configured to rotate about propeller axis "P-P".

Referring again to FIGS. 3A, 3B, and 4, propeller 344 includes a plurality of blades 354 circumferentially spaced about propeller base 352 (see also FIGS. 6 and 7) and extending radially outwardly from propeller axis "P-P" such that, as propeller 344 is rotated about propeller axis "P-P," blades 354 cooperate to define a substantially circular blade path area "A" transverse to and centered about propeller axis "P-P". Blade path area "A" thus extends from a center "c" on propeller axis "P-P" to the free ends of blades 354 and defines a diameter "d" and a radius "r". Extending blade path area "A" along propeller axis "P-P" defines a cylindrical volume having a height extending along propeller axis "P-P" and diameter "d" and radius "r" centered about propeller axis "P-P".

Air inlet 348 defines an opening 349 through which air flows from the external environment into air inlet 348 and, ultimately, to an inner passageway of hybrid electric turboprop 340, e.g., air duct 390, 392 (see FIGS. 6 and 7, respectively), an air plenum, and/or other air passageway, or to an internal component(s) of hybrid electric turboprop 340, e.g., for air cooling the internal component(s). Air inlet 348 is disposed rearwardly of propeller 344 and at least partially within the cylindrical volume defined by extending blade path area "A" along propeller axis "P-P". Air inlet 348, more specifically, is positioned to define a radial distance "i" from propeller axis "P-P" to a location within opening 349 of air inlet 348 such that opening 349 of air inlet 348 is at least partially disposed within the radial distance "i"; in aspects, opening 349 of air inlet 348 is fully disposed within the radial distance "i". Although radial distance "i" is illustrated as extending from propeller axis "P-P" to an outer most extent of opening 349 (such that opening 349 of air inlet 348 is fully disposed within the radial distance "i"), radial distance "i" may extend to any other suitable location within opening 349 of air inlet 348 such as, for example, to: a radial inner most extent of opening 349 (if opening 349 defines a radial inner most extent), or from about at least 10% of the radial extent of opening 349 to about at least 90% of the radial extent of opening 349 in increments of 10%. The inner most and outer most extents of opening 349 of air inlet 348 are the respective radially-inward and radially-outward most portions of opening 349 that enable the flow of air from the external environment through opening 349 and into air inlet 348. Thus, these extents excludes the material forming air inlet 348 as well as changes in dimension(s) or location(s) of air passageways (e.g., plenum, ducts, and/or other passageways) downstream of opening 349. In configurations wherein air inlet 348 is disposed about propeller axis "P-P," opening 349 does not include an inner most extent. Thus, the radial locations within opening 349 are defined form the inner most extent to the outer most extent or, where no inner most extent is defined, from propeller axis "P-P" to the outer most extent.

Positioning opening 349 of air inlet 348 relative to propeller 344 in the manner noted above enables, as air flows across propeller 344 to generate forward thrust, a portion of the air to enter air inlet 348 via opening 349. As detailed below, air inlet 348 may communicate with: an engine intake to provide intake air to the engine; one or more heat-generating components for air cooling of the heat-generating component(s); and/or provide airflow to any other suitable component(s) or system(s).

With continued reference to FIGS. 3A, 3B, and 4, the location of opening 349 of air inlet 348 relative to propeller 344 and, in particular, the radial distance "i" defined by air inlet 348, impacts the efficiency of hybrid electric turboprop 340. More specifically, air entering air inlet 348 has relatively less swirl and creates relatively less system drag at relatively smaller radial distances "i" compared to relatively larger radial distances "i". Thus, in accordance with this disclosure, the radial distance "i" is: in aspects, equal to or less than about 60% of the radius "r" (or between about 10% and about 60% of the radius "r"); in other aspects, equal to or less than about 55% of the radius "r" (or between about 10% and about 55% of the radius "r"); in still other aspects, equal to or less than about 50% of the radius "r" (or between about 10% and about 50% of the radius "r"); in yet other aspects, equal to or less than about 45% of the radius "r" (or between about 10% and about 45% of the radius "r"); or, in still yet other aspects, equal to or less than about 40% of the radius "r" (or between about 10% and about 40% of the radius "r").

Figure 5:
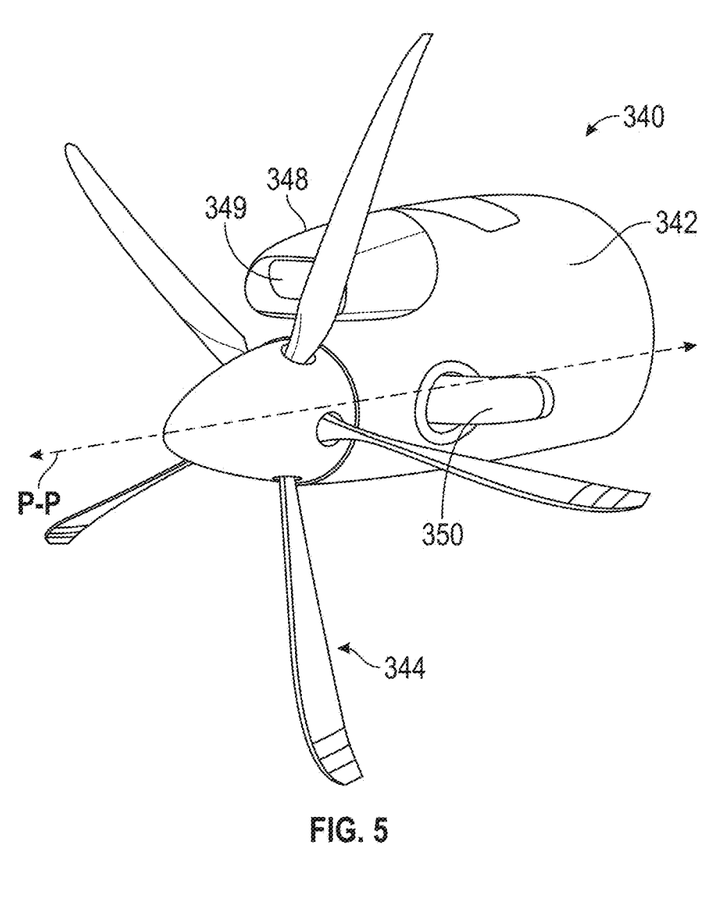
FIG. 5 is a front, perspective view of another configuration of a hybrid electric turboprop in accordance with this disclosure.

Referring to FIG. 5, hybrid electric turboprop 340 detailed above with reference to FIGS. 3A-4 provides a configuration wherein air inlet 348 is offset below propeller axis "P-P;" however, it is also contemplated that hybrid electric turboprop 340 in accordance with this disclosure include air inlet 348 offset above the propeller axis "P-P," as shown in FIG. 5. Thus, any aspects or features detailed herein with respect to one orientation of the air inlet, e.g., wherein air inlet 348 (FIG. 3A) is offset below propeller axis "P-P," is likewise applicable for use with the opposite orientation, e.g., wherein air inlet 348 is offset above propeller axis "P-P," and vice versa. Further, this disclosure is not limited to vertical alignments, as configurations are contemplated wherein air inlet 348 is disposed at any suitable location relative to propeller axis "P-P". Additionally, in aspects, multiple air inlets 348 may be provided in any suitable locations, some or all of which include the radial distance "i" defined within the opening 349 thereof.

Figure 6:
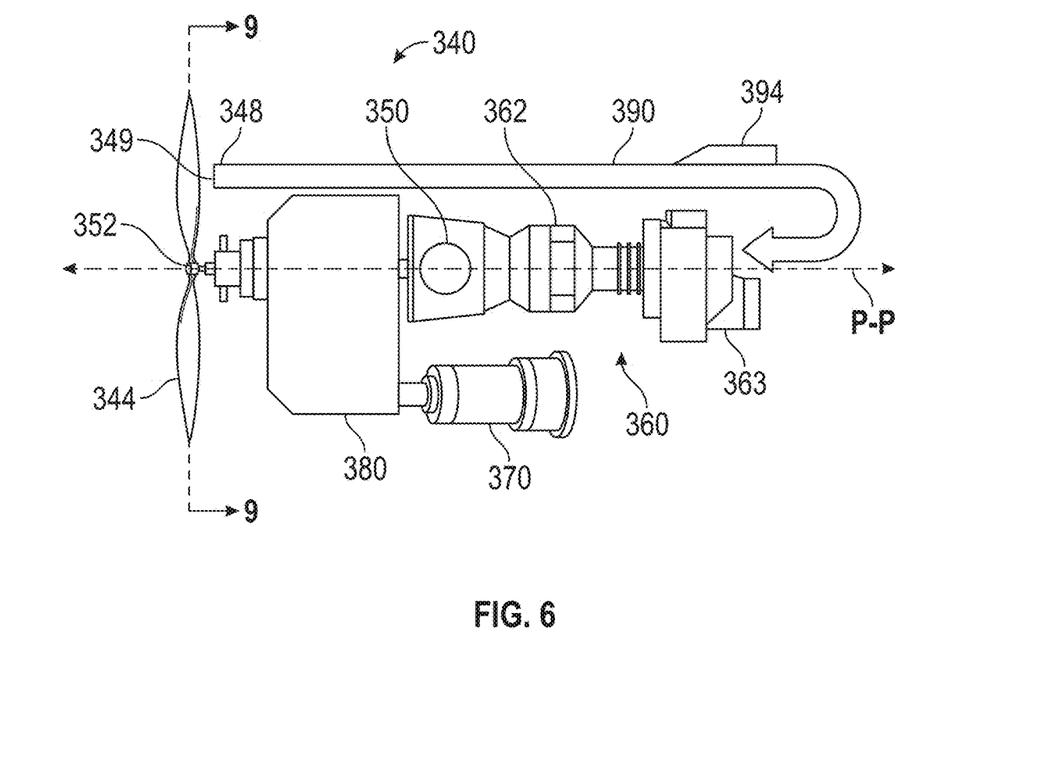
FIG. 6 is a side, partial schematic illustration of a portion of the hybrid electric turboprop of FIG. 5.
Figure 7:
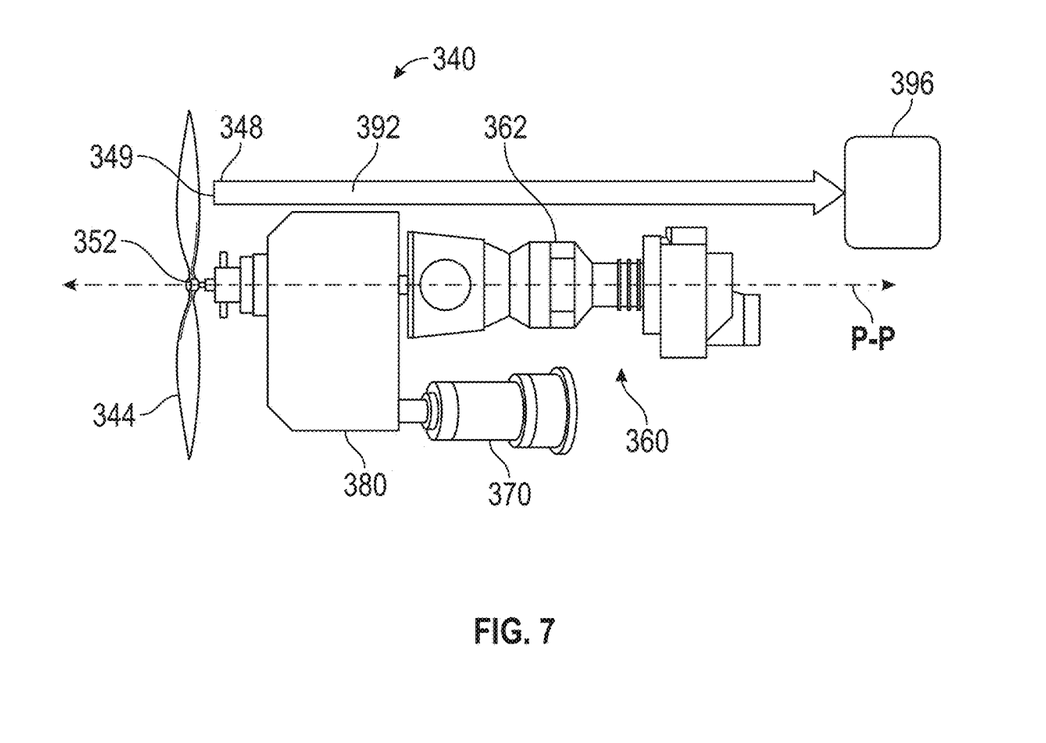
FIG. 7 is a side, partial schematic illustration of a portion of another hybrid electric turboprop in accordance with this disclosure.

Turning to FIGS. 6 and 7, in conjunction with FIGS. 3A-4, the components (and interconnections therebetween) of internal drive system 360 of hybrid electric turboprop 340 and, in particular, thermal engine 362, electric motor 370, and gearbox 380 of internal drive system 360, introduce spatial constraints that create challenges with respect to locating at least a portion of air inlet 348 within the radial distance "i" (see FIG. 4). More specifically, and as noted above, gearbox 380 is coupled to thermal engine 362 and electric motor 370 on an input side of gearbox 380, and to propeller base 352 on an output side of gearbox 380 to enable rotational driving of propeller base 352 and, thus, propeller 344 from either or both of thermal engine 362 and/or electric motor 370. In aspects, gearbox 380 is positioned forwardly, e.g., closer to propeller 344, while thermal engine 362 and electric motor 370 are positioned rearwardly, e.g., farther from propeller 344, and in substantial vertical alignment with one another. In these and/or other aspects, the one or more exhausts 350 may include an exhaust 350 (only one of which is shown in each of FIGS. 6 and 7) disposed on either lateral side of propeller axis "P-P" in substantial horizontal alignment with one another and thermal engine 362 (and substantially transverse to the vertical alignment of thermal engine 362 and electric motor 370). In at least some aspects, thermal engine 362 and electric motor 370 extend in substantially parallel orientation relative to one another and/or in substantially parallel or coaxial orientation relative to propeller axis "P-P".

Referring in particular to FIG. 6, in aspects, air inlet 348 is connected to an air duct 390 that is routed along and to the rearward end of thermal engine 362 to couple to intake 363 of thermal engine 362, e.g., such that thermal engine 362 defines a reverse-flow configuration. In other aspects, air duct 390 is routed to connect air inlet 348 to other intake locations of thermal engine 362. In aspects, air duct 390 includes a door 394 configured to open or close a path between air duct 390 and the external environment to enable the removal of ice particles from the air prior to reaching thermal engine 362. Door 394 may be actively driven, e.g., opened and closed by a motor, or passive, e.g., opened and closed by ambient conditions, e.g., force applied by ice particles (or lack thereof), temperature (or temperature differential), pressure (or pressure differential), etc. In actively driven configurations of door 394, door 394 may be driven to open or close based on feedback from a sensor coupled to the airflow path such as, for example, a sensor detecting ice particles in the air or other properties indicative of ice particles in the air.

In additional or alternative aspects, as shown in FIG. 7, air inlet 348 is connected to an air duct 392 that is routed to one or more heat-generating components 396 of hybrid electric turboprop 340, e.g., for air cooling the component(s) 396. Air duct 392 may also include a door 394 as detailed above with respect to air duct 390 (see FIG. 6).

Figure 8A:
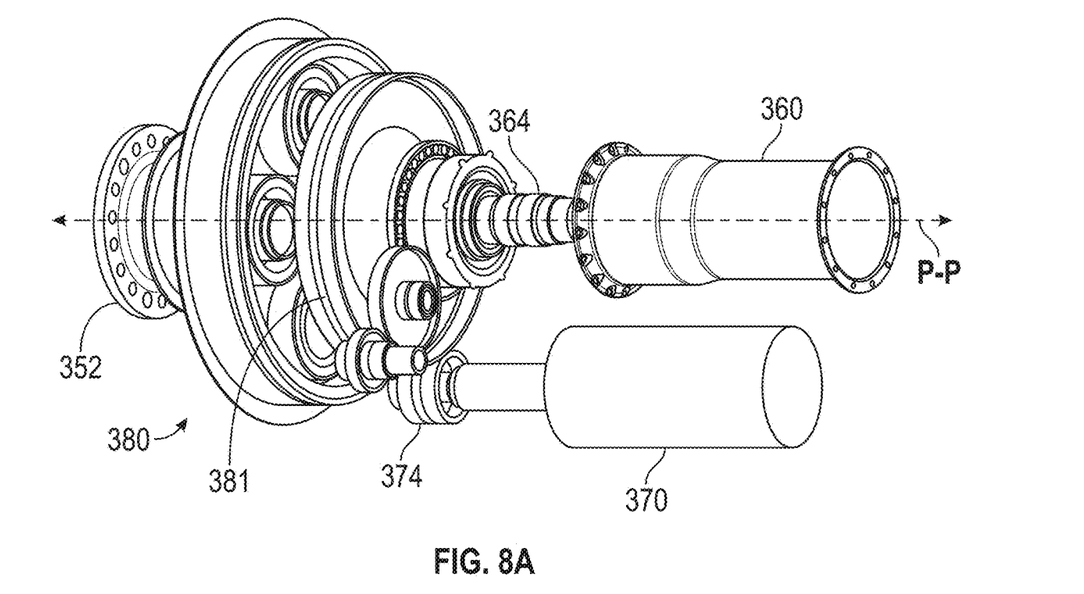
FIG. 8A is a perspective view of a gearbox of the hybrid electric turboprop of FIG. 6 shown coupling the thermal engine and electric motor of the hybrid electric turboprop with the propeller of the hybrid electric turboprop in accordance with this disclosure.
Figure 8B:
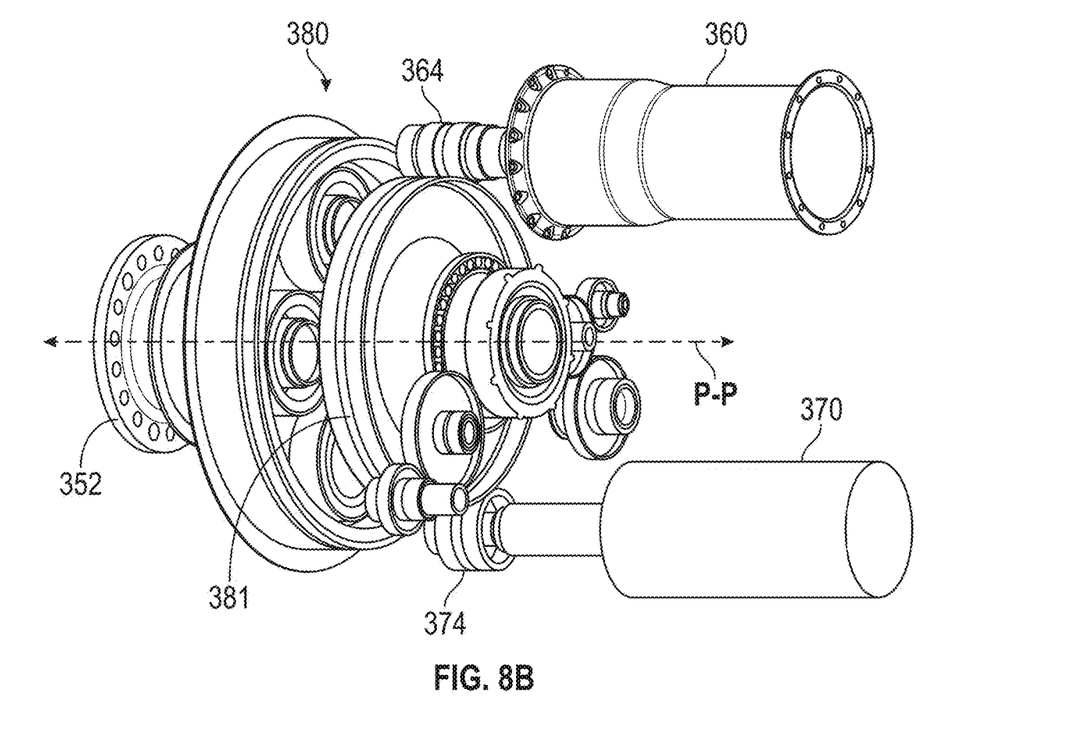
FIG. 8B is a perspective view of another gearbox in accordance with this disclosure shown coupling the thermal engine and electric motor of a hybrid electric turboprop with a propeller of the hybrid electric turboprop.

With reference to FIG. 8A, in conjunction with FIGS. 6 and 7, in aspects, gearbox 380 includes an epicyclic gearbox 381 coupling thermal engine 362 and electric motor 370, on the input side of gearbox 380, with propeller base 352, on the output side of gearbox 380. However, other suitable gearbox configurations are also contemplated. Regardless of the particular gearbox configuration, thermal engine 362 and/or electric motor 370 may be coupled to gearbox 380 via (or gearbox 380 may include) clutch 364 and/or clutch 374, respectively, thus enabling selection of the power source driving rotation of propeller base 352, e.g., either or both of thermal engine 362 and/or electric motor 370. Further, gearbox 380 may be configured, and thermal engine 362 positioned such that, as shown in FIG. 8A, the output of thermal engine 362 is substantially coaxial with propeller axis "P-P" and, thus, propeller base 352. Alternatively, as shown in FIG. 8B, the output of thermal engine 362 may be radially offset from propeller axis "P-P" and, thus, propeller base 352, e.g., on an opposite side of propeller axis "P-P" compared to electric motor 370. Further still, although thermal engine 362 is shown disposed vertically above electric motor 370, the opposite configuration, e.g., wherein thermal engine 362 is vertically below electric motor 370, is also contemplated, as are other alignment configurations.

Figure 9:
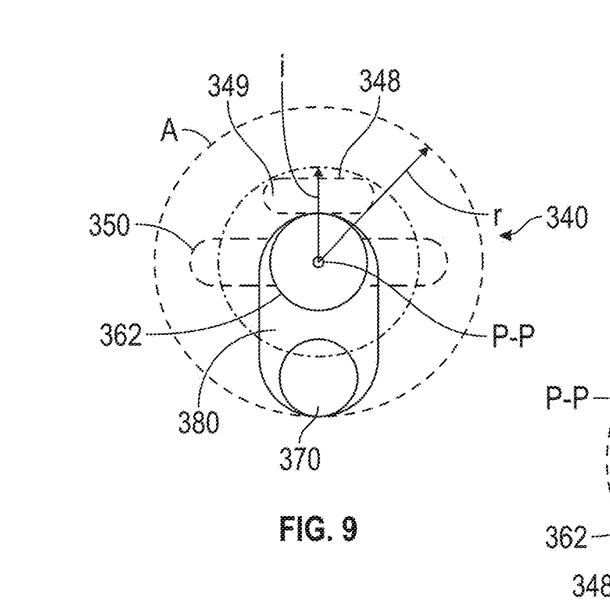
FIG. 9 is a transverse, cross-sectional view taken along section line "9-9" of FIG. 6, illustrating the positioning of the thermal engine, electric motor, gearbox, air inlet, and exhausts relative to one another and the propeller diameter of the hybrid electric turboprop in accordance with this disclosure.

Turning to FIG. 9, in conjunction with FIGS. 6 and 7, in aspects, gearbox 380 defines a dimension, along a line segment that includes radial distance "i," that is: in aspects, equal to or greater than about 30% of the diameter "d" of blade path area "A"; in other aspects, equal to or greater than about 35% of the diameter "d" of blade path area "A"; in still other aspects, equal to or greater than about 40% of the diameter "d" of blade path area "A"; in yet other aspects, equal to or greater than about 45% of the diameter "d" of blade path area "A"; or, in still yet other aspects, equal to or greater than about 50% of the diameter "d" of blade path area "A". As can be appreciated, relative to the radius "r" of the blade path area "A", the above-noted percentages are multiplied by two (2). Thus, in aspects, centering gearbox 380 about propeller axis "P-P" at least along the line segment that includes the radial distance "i" precludes locating air inlet 348 within the radial distance "i" without further modification. Locating air inlet 348 outside the radial distance "i", as detailed above, allows for more swirl and more system drag, thus reducing the efficiency of hybrid electric turboprop 340.

Accordingly, in order to enable positioning of air inlet 348 at least partially within the radial distance "i", gearbox 380 may, in aspects, be positioned off-center from propeller axis "P-P" along the line segment that includes the radial distance "i" and in an opposite direction from air inlet 348, as shown in FIGS. 6 and 7. In such aspects, thermal engine 362 may be substantially coaxial with propeller axis "P-P" or at least substantially aligned with propeller axis "P-P" at least along the line segment that includes the radial distance "i". Electric motor 370, in these and/or other aspects, may be positioned off-center from propeller axis "P-P" in the same direction as gearbox 380 and, thus, in an opposite direction from air inlet 348.

Figure 10:
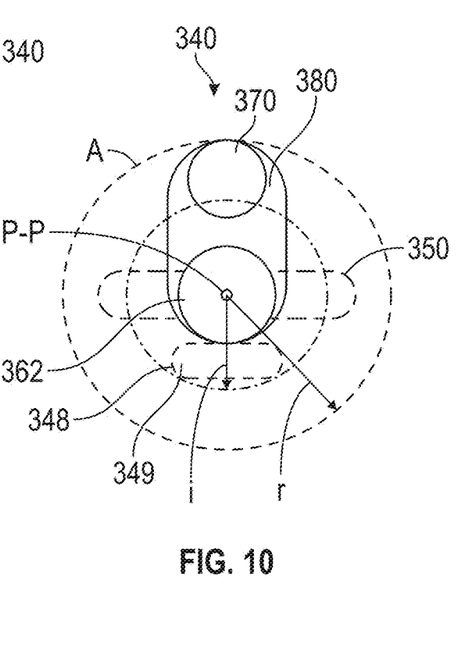
FIG. 10 is a transverse, cross-sectional view of another hybrid electric turboprop configuration in accordance with this disclosure illustrating the positioning of the thermal engine, electric motor, gearbox, air inlet, and exhausts relative to one another and the propeller diameter of the hybrid electric turboprop.

The above-detailed configuration illustrated in FIG. 9, wherein air inlet 348 is disposed vertically above propeller axis "P-P", gearbox 380 and electric motor 370 are offset vertically below propeller axis "P-P", and thermal engine 362 is aligned on propeller axis "P-P", may be reversed, as shown in FIG. 10, such that air inlet 348 is disposed vertically below propeller axis "P-P", gearbox 380 and electric motor 370 are offset vertically above propeller axis "P-P", and thermal engine 362 is aligned on propeller axis "P-P".

Figure 11:
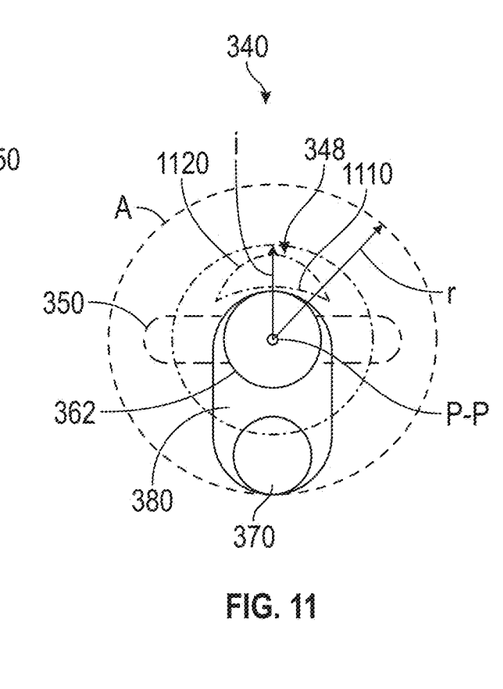
FIG. 11 is a transverse, cross-sectional view of still another hybrid electric turboprop configuration in accordance with this disclosure illustrating the positioning of the thermal engine, electric motor, gearbox, air inlet, and exhausts relative to one another and the propeller diameter of the hybrid electric turboprop.

Referring to FIG. 11, in order to facilitate positioning of air inlet 348 at least partially within the radial distance "i" and/or to enable a reduction in the radial distance "i", air inlet 348 may include one or more conforming portions 1110, 1120. Conforming portions 1110, 1120 of air inlet 348 are portions of air inlet 348 that at least partially conform to a radially inner portion of air inlet 348 about an exterior of gearbox 380 in an annular direction about propeller axis "P-P" and/or a radially outer portion of air inlet 348 to within a circle defined by the radial distance "i" in an annular direction about propeller axis "P-P". For example, conforming portions 1110, 1120 may define arcuate configurations in transverse cross-section (as shown in FIG. 11). As another example, conforming portions 1110, 1120 may include two or more angled sections in transverse cross-section. Whether arcuate, angled, combinations thereof, or defining another configuration, conforming portions 1110, 1120 may precisely conform to the exterior of gearbox 380 and/or the circle defined by the radial distance "i", e.g., defining the same curvature and/or angles, or may approximately conform thereto, e.g., defining curvature and/or angles in similar directions. Thus, as utilized herein, reference to "conforming portions" or reference to portions configured "to conform" includes both precise conformation and approximate conformation. By at least partially conforming in an annular direction about propeller axis "P-P", conforming portions 1110, 1120 of air inlet 348 facilitate positioning air inlet 348 at least partially within the radial distance "i" and/or enable a reduction in the radial distance "i" without requiring or requiring less repositioning of gearbox 380.

Figure 12:
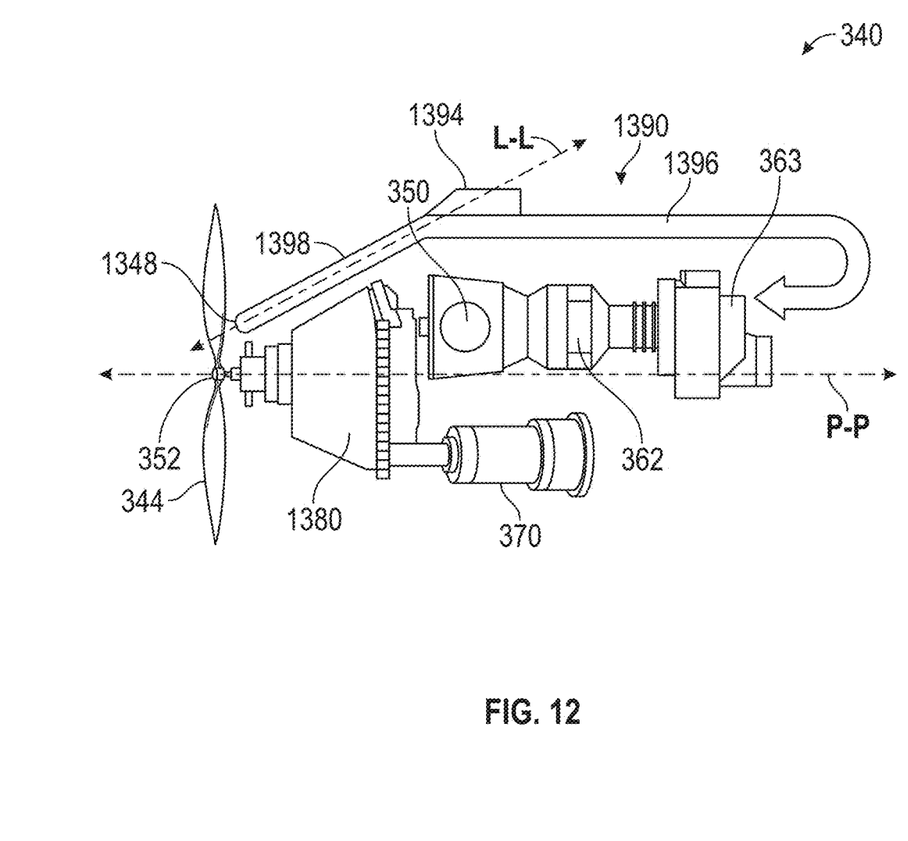
FIG. 12 is a side, partial schematic illustration of another configuration of a hybrid electric turboprop in accordance with this disclosure.
Figure 13:
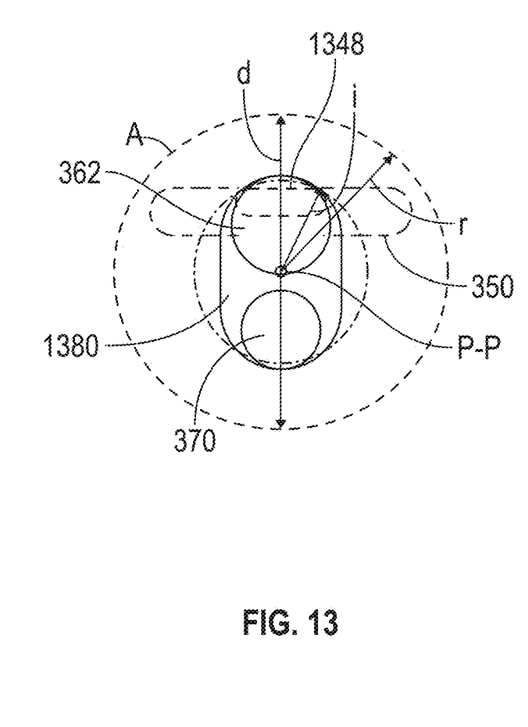
FIG. 13 is a transverse, cross-sectional view illustrating the positioning of the thermal engine, electric motor, gearbox, air inlet, and exhausts relative to one another and the propeller diameter of the configuration of the hybrid electric turboprop of FIG. 12.

Turning to FIGS. 12 and 13, hybrid electric turboprop 340, in aspects, may include a tapered gearbox 1380 defining a tapered configuration wherein a more-rearward portion of tapered gearbox 1380 (farther from propeller 344) defines at least one first dimension that is greater than at least one corresponding second dimension of a more-forward portion of tapered gearbox 1380 (closer to propeller 344). In aspects, tapered gearbox 1380 is at least partially frustoconical in shape (and the first and second dimensions are different radii of tapered gearbox 1380). Tapered gearbox 1380 may be aligned on, e.g., substantially coaxial with, propeller axis "P-P" or may be offset relative to propeller axis "P-P".

The first dimension of tapered gearbox 1380, along the line segment that includes the radial distance "i", may extend from propeller axis "P-P" along the line segment that includes the radial distance "i": in aspects, equal to or greater than about 40% of the radius "r"; in other aspects, equal to or greater than about 45% of the radius "r"; in still other aspects, equal to or greater than about 50% of the radius "r"; in yet other aspects, equal to or greater than about 55% of the radius "r"; or, in still yet other aspects, equal to or greater than about 60% of the radius "r", while the second dimension of tapered gearbox 1380 may extend from propeller axis "P-P" along the line segment that includes the radial distance "i": in aspects, equal to or less than about 60% of the radius "r"; in other aspects, equal to or less than about 55% of the radius "r"; in still other aspects, equal to or less than about 50% of the radius "r"; in yet other aspects, equal to or less than about 45% of the radius "r"; or, in still yet other aspects, equal to or less than about 40% of the radius "r".

Thus, while sufficient clearance is provided to enable at least a portion of air inlet 1348 to fit within the radial distance "i" at the more-forward portion of tapered gearbox 1380, such clearance is insufficient to enable the at least a portion of air inlet 1348 to fit within the radial distance "i" at the more-rearward portion of tapered gearbox 1380. Accordingly, an air duct 1390 may be provided including a first portion 1396 positioned radially outwardly and rearwardly of tapered gearbox 1380 and a second portion 1398 that is angled and/or curved radially inwardly in a rearward-to-forward direction to at least partially conform to tapered gearbox 1380. Air inlet 1348 is defined at the forward end of second portion 1398 of air duct 1390 and, due to the configuration of second portion 1398 of air duct 1390, is positioned at least partially within the radial distance "i" at a location radially-inwardly of, or at least radially overlapping with, the radially-outward most extent of tapered gearbox 1380 along the line segment that includes the radial distance "i".

Continuing with reference to FIGS. 12 and 13, air duct 1390 may include a door 1394 as detailed above with respect to air duct 390 (see FIG. 6). Door 1394, in such aspects, may be disposed at the transition between first and second portions 1396, 1398 of air duct 1390, which may be an angled transition. Alternatively, door 1394 may be disposed along first portion 1396 adjacent the transition between first and second portions 1396, 1398 such that at least a portion of door 1394 is positioned radially outwardly of the longitudinal axis "L-L" defined by second portion 1398, which extents at an angle relative to propeller axis "P-P". Thus, air flowing through inlet 1348 and along second portion 1398 of air duct 1390 travels in a rearward and radially-outward direction, allowing centrifugal force to carry the relatively heavier ice particles radially outwardly through door 1394 while the relatively lighter air continues to first portion 1396 of air duct 1390 and, ultimately, to intake 363 of thermal engine 362 (and/or other components, e.g., for air cooling the components).

Figure 14:
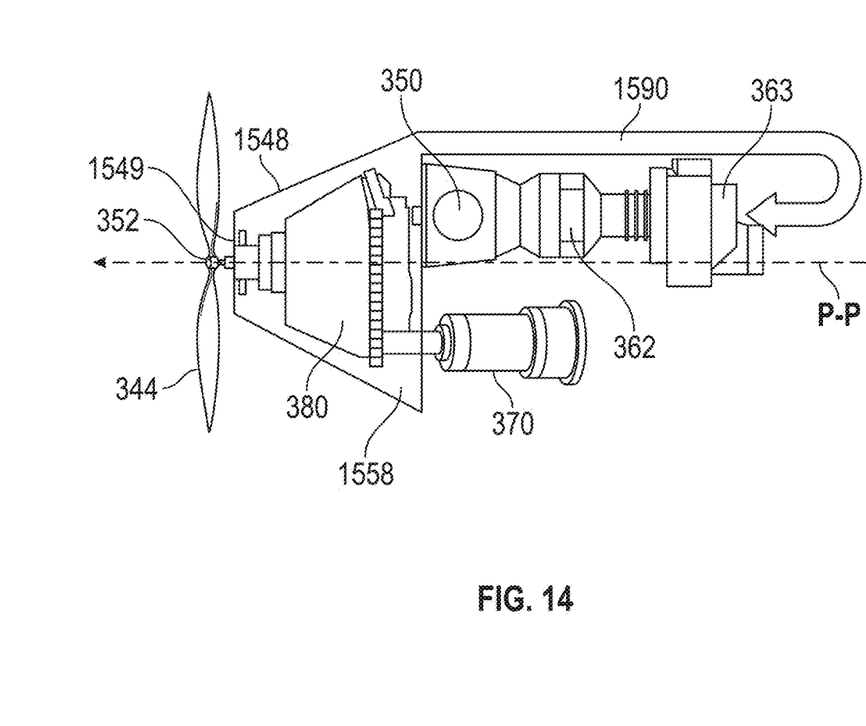
FIG. 14 is a side, partial schematic illustration of another configuration of a hybrid electric turboprop in accordance with this disclosure.
Figure 15:
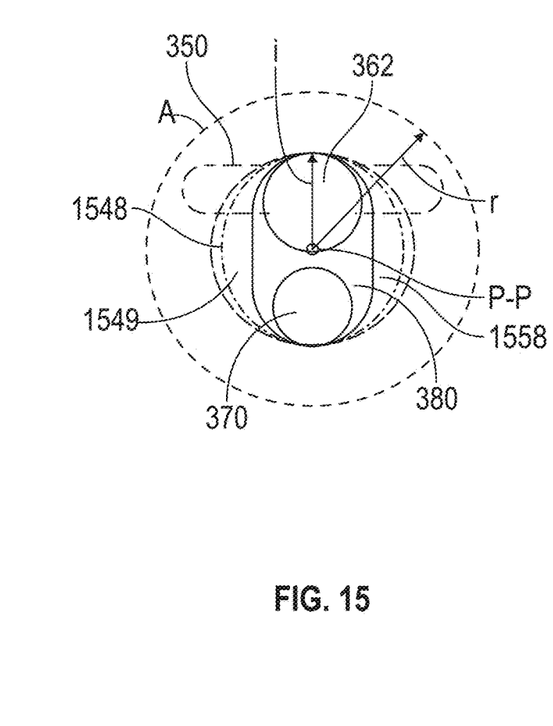
FIG. 15 is a transverse, cross-sectional view illustrating the positioning of the thermal engine, electric motor, gearbox, air inlet, and exhausts relative to one another and the propeller diameter of the configuration of the hybrid electric turboprop of FIG. 14.

With reference to FIGS. 14 and 15, hybrid electric turboprop 340, in aspects, may include an inlet 1548 defining an opening 1549 that circumferentially surrounds and is substantially coaxially disposed about propeller base 352 forwardly of gearbox 380. In such aspects, inlet 1548 may communicate with a plenum 1558 circumferentially surrounding and substantially coaxially disposed about at least a portion of gearbox 380. Plenum 1558, in turn, is connected to an air duct 1590 extending along thermal engine 362 to direct fluid from plenum 1558 to intake 363 at the rearward end of thermal engine 362 (and/or other components, e.g., for air cooling the components). Air inlet 1548 is disposed at least partially within the radial distance "i" and may define an opening 1549 having a circular transverse cross-section, a ring-shaped transverse cross-section or any other suitable configuration that radially surrounds at least a portion of propeller axis "P-P". Further, as a result of airflow through inlet 1548 and into plenum 1558, which at least partially surrounds gearbox 380, air flows around gearbox 380, functioning to cool gearbox 380 and/or melt ice particles in the air via the heat generated by gearbox 380, thus inhibiting ice particles from entering intake 363 of thermal engine 362.

Hybrid electric turboprops provided in accordance with the present disclosure overcome the spatial constraint challenges of having a thermal engine, electric motor, and gearbox to enable positioning of the air inlet in an effective and efficient location relative to the propeller. The particular configuration and/or location of the air inlet may be selected according to the configuration and/or location of the thermal engine, electric motor, and/or gearbox, and/or based upon the purpose of the air inlet, e.g., whether the air inlet is utilized for engine intake and/or component cooling.

Aspects of this disclosure may be further described by reference to the following clauses:

A hybrid electric turboprop, comprising: a propeller configured to rotate about a propeller axis, the propeller including a plurality of blades extending radially outwardly from the propeller axis such that, as the propeller is rotated about the propeller axis, the plurality of blades defining a substantially circular blade path area centered about the propeller axis and having a radius; a thermal engine; an electric motor; a gearbox coupling both the thermal engine and the electric motor to the propeller to enable each of the thermal engine and the electric motor to drive rotation of the propeller about the propeller axis; and an air inlet defining an opening, wherein a radial distance is defined from the propeller axis to a location within the opening, and wherein the radial distance is equal to or less than 60% of the radius.

The hybrid electric turboprop according to any other clause, wherein the radial distance is equal to from 10% to 50% of the radius.

The hybrid electric turboprop according to any other clause, wherein the location is a radially outer most extent of the opening.

The hybrid electric turboprop according to any other clause, wherein the thermal engine and the electric motor extend in substantially parallel orientation relative to one another.

The hybrid electric turboprop according to any other clause, wherein the thermal engine is substantially coaxial relative to the propeller axis.

The hybrid electric turboprop according to any other clause, wherein the gearbox is off-center relative to the propeller axis.

The hybrid electric turboprop according to any other clause, wherein the gearbox defines a dimension, along a line segment that includes the radial distance, of equal to or greater than 60% of the radius.

The hybrid electric turboprop according to any other clause, wherein the gearbox includes an epicyclic gearbox.

The hybrid electric turboprop according to any other clause, wherein the opening of the air inlet includes at least one inner conforming portion at least partially conforming to an exterior of the gearbox in an annular direction about the propeller axis.

The hybrid electric turboprop according to any other clause, wherein the opening of the air inlet includes at least one outer conforming portion at least partially conforming to a circle centered about the propeller axis and defining a radius equal to the radial distance.

The hybrid electric turboprop according to any other clause, further comprising an air duct coupled to the air inlet, wherein a portion of the gearbox tapers inwardly towards the propeller axis in a direction along the propeller axis, and wherein a portion of the air duct at least partially conforms to the portion of the gearbox in the direction along the propeller axis.

The hybrid electric turboprop according to the preceding clause, wherein the portion of the air duct, at a position farther from the propeller along the propeller axis relative to the opening of the air inlet, extends radially outwardly beyond the radial distance.

The hybrid electric turboprop according to any other clause, further comprising an air duct coupling the air inlet to an air intake of the thermal engine.

The hybrid electric turboprop according to the preceding clause, wherein the thermal engine defines a reverse-flow configuration wherein the air intake is disposed farther from the propeller compared to an exhaust of the thermal engine.

The hybrid electric turboprop according to any other clause, further comprising an air duct coupling the air inlet to at least one heat-generating component for air cooling the at least one heat-generating component with air flowing through the opening of the inlet.

The hybrid electric turboprop according to any other clause, further comprising an air duct coupled to the air inlet, the air duct including a door enabling removal of ice particles in airflow through the airduct.

The hybrid electric turboprop according to the preceding clause, wherein a portion of the air duct defines a longitudinal axis disposed at an angle relative to the propeller axis, and wherein at least a portion of the door is positioned radially outwardly of the longitudinal axis the relative to the propeller axis.

The hybrid electric turboprop according to any other clause, wherein the opening of the air inlet is disposed about the propeller axis.

The hybrid electric turboprop according to the preceding clause, wherein the opening of the air inlet is disposed in fluid communication with a plenum surrounding at least a portion of the gearbox such that airflow through the air inlet and into the plenum cools the gearbox and/or such that heat generated by the gearbox melts ice particles in the airflow.

The hybrid electric turboprop according to either of the two preceding clauses, further comprising an air duct connecting the plenum to at least one of: an air intake of the thermal engine or at least one heat-generating component.

While several aspects and features of this disclosure are described above and shown in the drawings, it is not intended that this disclosure be limited thereto, as it is intended that the disclosure be as broad in scope as the art will allow and that the specification be read likewise. Therefore, the above description should not be construed as limiting, but merely as exemplifications of particular aspects. Additionally, the aspects and features shown or described in connection with certain configurations may be combined with the aspects and features of certain other configurations without departing from the scope of this disclosure, and such modifications and variations are included within the scope of this disclosure. Accordingly, the subject matter of this disclosure is not limited by what has been particularly shown and/or described.

What is claimed is:

1. A hybrid electric turboprop, comprising:
    a propeller configured to rotate about a propeller axis, the propeller including a plurality of blades extending radially outwardly from the propeller axis such that, as the propeller is rotated about the propeller axis, the plurality of blades define a substantially circular blade path area centered about the propeller axis and having a radius;
    a thermal engine;
    an electric motor;
    a gearbox coupling both the thermal engine and the electric motor to the propeller to enable each of the thermal engine and the electric motor to drive rotation of the propeller about the propeller axis;
    an air inlet defining an opening, wherein a radial distance is defined from the propeller axis to a location within the opening; and
    an air duct coupling the air inlet to an air intake of the thermal engine, the thermal engine defining a reverse-flow configuration wherein the air intake is disposed farther from the propeller compared to an exhaust of the thermal engine, and
    wherein the radial distance is equal to or less than 60% of the radius.

2. The hybrid electric turboprop according to claim 1, wherein the radial distance is equal to from 10% to 50% of the radius.

3. The hybrid electric turboprop according to claim 1, wherein the location is a radially outer most extent of the opening.

4. The hybrid electric turboprop according to claim 1, wherein the thermal engine and the electric motor extend in substantially parallel orientation relative to one another.

5. The hybrid electric turboprop according to claim 1, wherein the thermal engine is substantially coaxial relative to the propeller axis.

6. The hybrid electric turboprop according to claim 1, wherein the gearbox is off-center relative to the propeller axis.

7. The hybrid electric turboprop according to claim 1, wherein the gearbox defines a dimension, along a line segment that includes the radial distance, of equal to or greater than 60% of the radius.

8. The hybrid electric turboprop according to claim 1, wherein the gearbox includes an epicyclic gearbox.

9. The hybrid electric turboprop according to claim 1, wherein the opening of the air inlet includes at least one inner conforming portion at least partially conforming to an exterior of the gearbox in an annular direction about the propeller axis.

10. The hybrid electric turboprop according to claim 1, wherein the opening of the air inlet includes at least one outer conforming portion at least partially conforming to a circle centered about the propeller axis and defining a radius equal to the radial distance.

11. The hybrid electric turboprop according to claim 1, further comprising an air duct coupled to the air inlet, wherein a portion of the gearbox tapers inwardly towards the propeller axis in a direction along the propeller axis, and wherein a portion of the air duct at least partially conforms to the portion of the gearbox in the direction along the propeller axis.

12. A hybrid electric turboprop, comprising:
a propeller configured to rotate about a propeller axis, the propeller including a plurality of blades extending radially outwardly from the propeller axis such that, as the propeller is rotated about the propeller axis, the plurality of blades define a substantially circular blade path area centered about the propeller axis and having a radius;
a thermal engine;
an electric motor;
a gearbox coupling both the thermal engine and the electric motor to the propeller to enable each of the thermal engine and the electric motor to drive rotation of the propeller about the propeller axis;
an air inlet defining an opening, wherein a radial distance is defined from the propeller axis to a location within the opening, wherein the radial distance is equal to or less than 60% of the radius; and
an air duct coupled to the air inlet, wherein a portion of the gearbox tapers inwardly towards the propeller axis in a direction along the propeller axis, and wherein a portion of the air duct at least partially conforms to the portion of the gearbox in the direction along the propeller axis such that the portion of the air duct, at a position farther from the propeller along the propeller axis relative to the opening of the air inlet, extends radially outwardly beyond the radial distance.

13. The hybrid electric turboprop according to claim 12, wherein the air duct couples the air inlet to an air intake of the thermal engine.

14. The hybrid electric turboprop according to claim 12, wherein the air duct couples the air inlet to at least one heat-generating component for air cooling the at least one heat-generating component with air flowing through the opening of the inlet.

15. The hybrid electric turboprop according to claim 1, wherein the air duct includes a door enabling removal of ice particles in airflow through the air duct.

16. The hybrid electric turboprop according to claim 15, wherein a portion of the air duct defines a longitudinal axis disposed at an angle relative to the propeller axis, and wherein at least a portion of the door is positioned radially outwardly of the longitudinal axis relative to the propeller axis.

17. The hybrid electric turboprop according to claim 1, wherein the opening of the air inlet is disposed about the propeller axis.

18. A hybrid electric turboprop, comprising:
a propeller configured to rotate about a propeller axis, the propeller including a plurality of blades extending radially outwardly from the propeller axis such that, as the propeller is rotated about the propeller axis, the plurality of blades define a substantially circular blade path area centered about the propeller axis and having a radius;
a thermal engine;
an electric motor;
a gearbox coupling both the thermal engine and the electric motor to the propeller to enable each of the thermal engine and the electric motor to drive rotation of the propeller about the propeller axis; and
an air inlet defining an opening, wherein a radial distance is defined from the propeller axis to a location within the opening, wherein the radial distance is equal to or less than 60% of the radius, wherein the opening of the air inlet is disposed about the propeller axis, and wherein the opening of the air inlet is disposed in fluid communication with a plenum surrounding at least a portion of the gearbox such that airflow through the air inlet and into the plenum cools the gearbox and/or such that heat generated by the gearbox melts ice particles in the airflow.

19. The hybrid electric turboprop according to claim 18, further comprising an air duct connecting the plenum to an air intake of the thermal engine.

20. The hybrid electric turboprop according to claim 18, further comprising an air duct connecting the plenum to at least one heat-generating component.

\* \* \* \* \*